United States Patent [19]

Sevenhans et al.

[11] Patent Number: 5,263,023
[45] Date of Patent: Nov. 16, 1993

[54] DATA TRANSFER CONNECTION BETWEEN A PRIMARY DEVICE AND A PLURALITY OF SECONDARY WITH A REDUCED NUMBER OF LINKS

[75] Inventors: Joannes M. J. Sevenhans, Brasschaat; Edmond C. J. Op de Beeck, Mechelen, both of Belgium

[73] Assignee: Alcatel N.V., Amsterdam, Netherlands

[21] Appl. No.: 699,341

[22] Filed: May 13, 1991

[30] Foreign Application Priority Data

May 11, 1990 [EP] European Pat. Off. ......... 90201197.2

[51] Int. Cl.⁵ .......................... H04J 3/02; H04L 29/04
[52] U.S. Cl. ................................................. 370/85.11
[58] Field of Search .................. 370/85.9, 85.11, 85.1, 370/66, 67; 340/825.06, 825.07

[56] References Cited

U.S. PATENT DOCUMENTS

| | | | |
|---|---|---|---|
| 3,916,108 | 10/1975 | Schwartz | 179/15 |
| 3,919,483 | 11/1975 | Gindi et al. | 370/85.11 |
| 3,993,870 | 11/1976 | Schwartz | 179/15 |
| 4,010,326 | 3/1977 | Schwartz | 179/15 |

FOREIGN PATENT DOCUMENTS 55-10244 1/1980 Japan.
60-22335 11/1985 Japan.

Primary Examiner—Wellington Chin
Attorney, Agent, or Firm—Robbins, Berliner & Carson

[57] ABSTRACT

The primary device (DSP) is connected to m×n secondary devices CESLIC1-4) by one data link (10B) comprising the m×n data channels assigned to respective secondary devices (ESLIC1-4) say m clock links (GKC0-1) connected to m respective groups each of n secondary devices (ESLIC1-3; ESLIC2-4) and carrying m clock signals having a same clock frequency and being mutually shifted by $1/m^{th}$ of a cycle of the clock frequency, and by n read/write links (RD0-1) connected to n respective groups each of m secondary devices (ESLIC1-2; ESLIC3-4) and carrying n read/write signals mutually shifted by one cycle of the clock frequency, each secondary device (ESLIC1-4) belonging to a distinct pair of one group out of the m groups (ESLIC1-3; ESLIC2-4) and of one group out of the n groups (ESLIC1-2; ESLIC3-4).

8 Claims, 3 Drawing Sheets

FIG. 1

DATA TRANSFER CONNECTION BETWEEN A PRIMARY DEVICE AND A PLURALITY OF SECONDARY WITH A REDUCED NUMBER OF LINKS

TECHNICAL FIELD

The present invention relates to a data transfer connection between a primary device and a plurality of secondary devices, the connection comprising for each secondary device one data link, one clock link and one read/write link.

BACKGROUND ART

It is generally known that these three links constitute the minimum configuration of a data transfer connection so that in case the primary device has to be connected to a plurality of $m \times n$ secondary devices, the required data transfer connection has to comprise a total number of links equal to $3 \times m \times n$, each set of 3 links being associated to a distinct secondary device. For example, the data transfer connection between a primary device and four ($2 \times 2$) secondary devices then comprises $3 \times 4 = 12$ links.

This total number of links may be slightly reduced by using all the clock links as well as all the read/write links of the $m \times n$ secondary devices in common. Indeed, as a result the primary device is then only connected to one clock link, one read/write link and as many data links as there are secondary devices so that the data transfer connection then comprises a total of $2+(m \times n)$ links, each data link being associated to a distinct secondary device.

A drawback of such a connection is that when the primary device is integrated on an electronic chip the relatively high number of links ($3 \times m \times n$ or $2+(m \times n)$) also requires an identical high number of pins and this is generally unacceptable.

DISCLOSURE OF INVENTION

An object of the present invention is to provide a data transfer connection of the above type but requiring a relatively smaller number of links.

According to the invention, this object is achieved due to the fact that said primary device is connected to $m \times n$ secondary devices by one data link comprising $m \times n$ data channels assigned to respective ones of said secondary devices, by m clock links connected to m respective groups each of n secondary devices and carrying m clock signals having a same clock frequency and being mutually shifted by $1/m^{th}$ of a cycle of said clock frequency, and by n read/write links connected to n respective groups each of m secondary devices and carrying n read/write signals mutually shifted by one cycle of said clock frequency, each of said secondary devices belonging to a distinct pair of one group out of said m groups and of one group out of said n groups.

In this way the above number of $2+(m \times n)$ links becomes $1+m+n$ and for practical values of m and n, the latter value is smaller than the first one.

The present invention is based on the insight of assigning channels of a multiplex data link to respective secondary devices and of giving the m clock links and the n read/write links a double purpose: carrying the clock signal and the read/write signal respectively and by their combination allowing data transfer to the secondary devices over the allocated channels.

It is to be noted that a configuration with one data link carrying the $m \times n$ multiplexed data, one clock link and $m \times n$ read/write links each selecting one of the secondary devices could also be envisaged. However in this case again $2+m \times n$ links are required.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
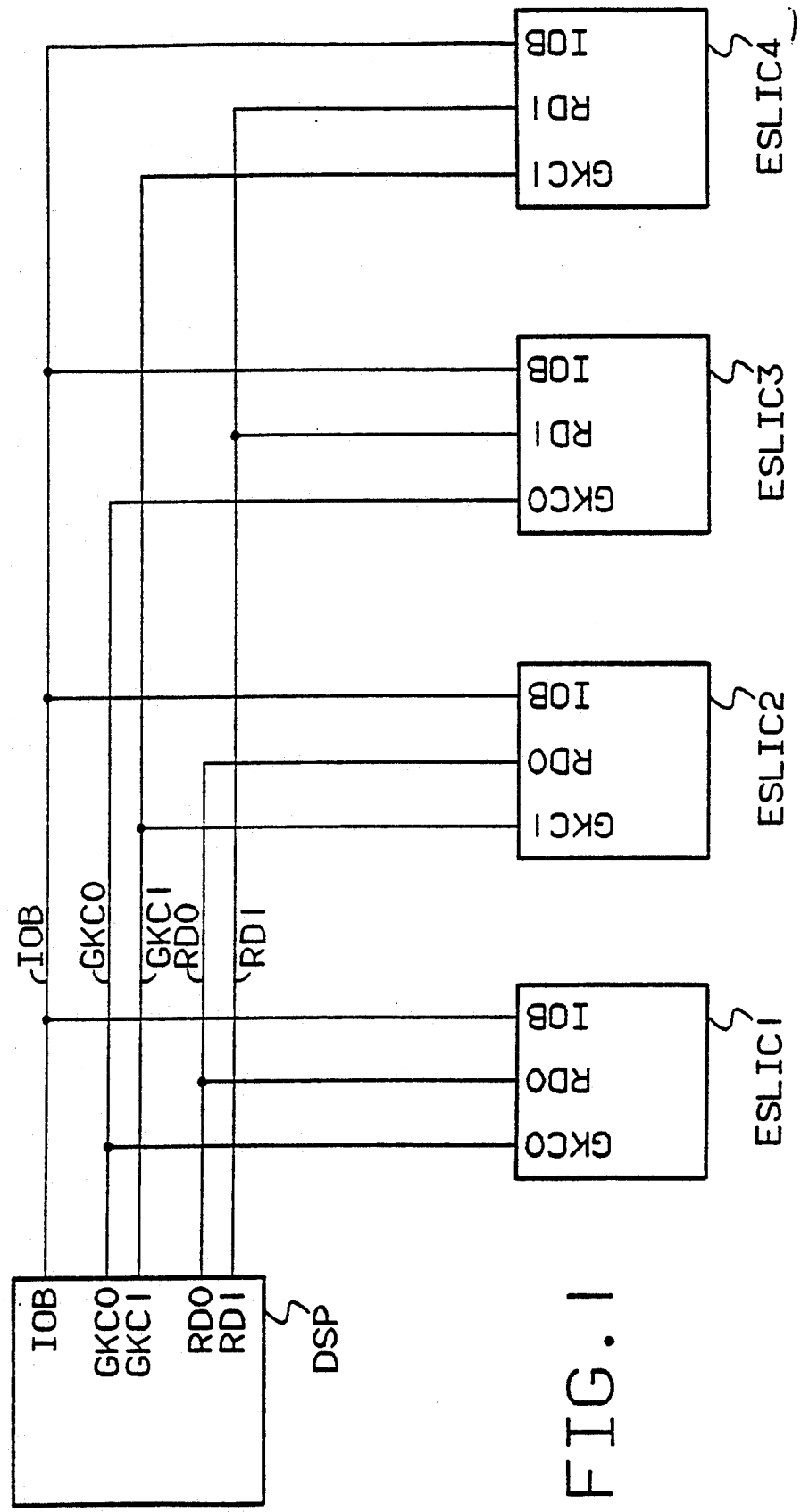
FIG. 1 shows a data transfer connection between a primary device (DSP) and four secondary devices (ESLIC1-4) according to the invention.

FIG. 1 shows a portion of a digital communication exchange and more particularly a data transfer connection between a primary device constituted by an electronic chip DSP carrying 4 Digital Signal Processors (not shown) and 4 secondary devices constituted by respective Enhanced Subscriber Line Interface Circuits ESLIC1 to ESLIC4. This data transfer connection links the DSP to any of the 4 line interface circuits ESLIC1/4 by sets of three links:

a clock link GKC0 or GKC1 carrying a like named 512 kHz clock signal with a 25% duty cycle between like named terminals;

a read/write link RD0 or RD1 carrying a like named 8 kHz read/write control signal between like named terminals; and a bidirectional input/output multiplex data link 10B.

Figures 2, 4:
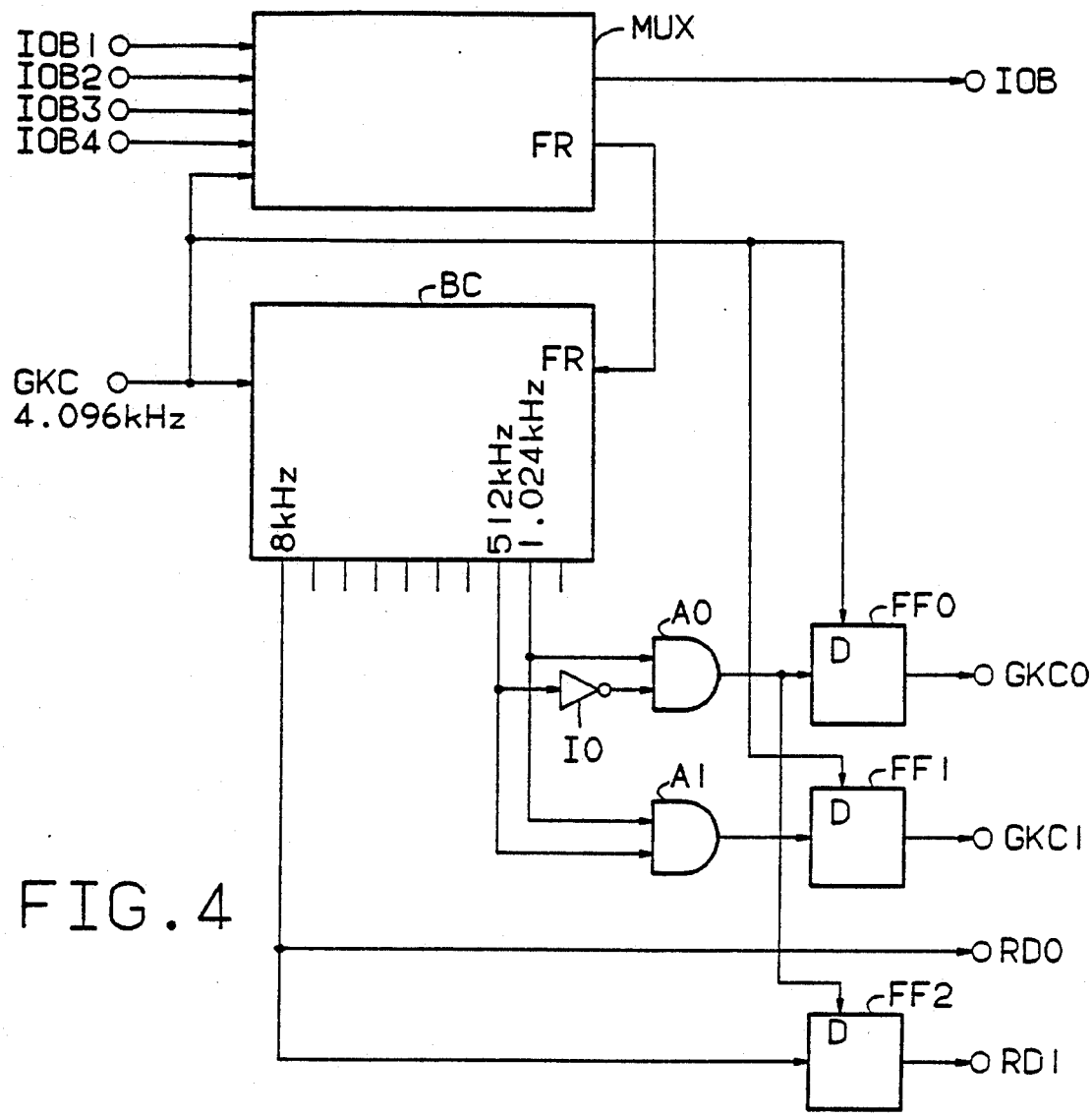
FIG. 2 is a table representing the selection of the secondary devices (ESLIC1-4) according to the connections or links (10B, GKC0-1, RD0-1) of FIG. 1.
FIG. 4 shows a circuit for generating the signals of FIG. 3.

More particularly and by making also reference to the table of FIG. 2, the DSP is connected:

to the line interface circuit ESLIC1 via the links GKC0, RD0 and 10B;

to ESLIC2 via the links GKC1, RD0 and 10B;

to ESLIC3 via the links GKC0, RD1 and 10B; and to ESLIC4 via the links GKC1, RD1 and 10B.

The voltage levels used on these links are compatible with the standard 5 Volt CMOS logic families.

Figure 3:
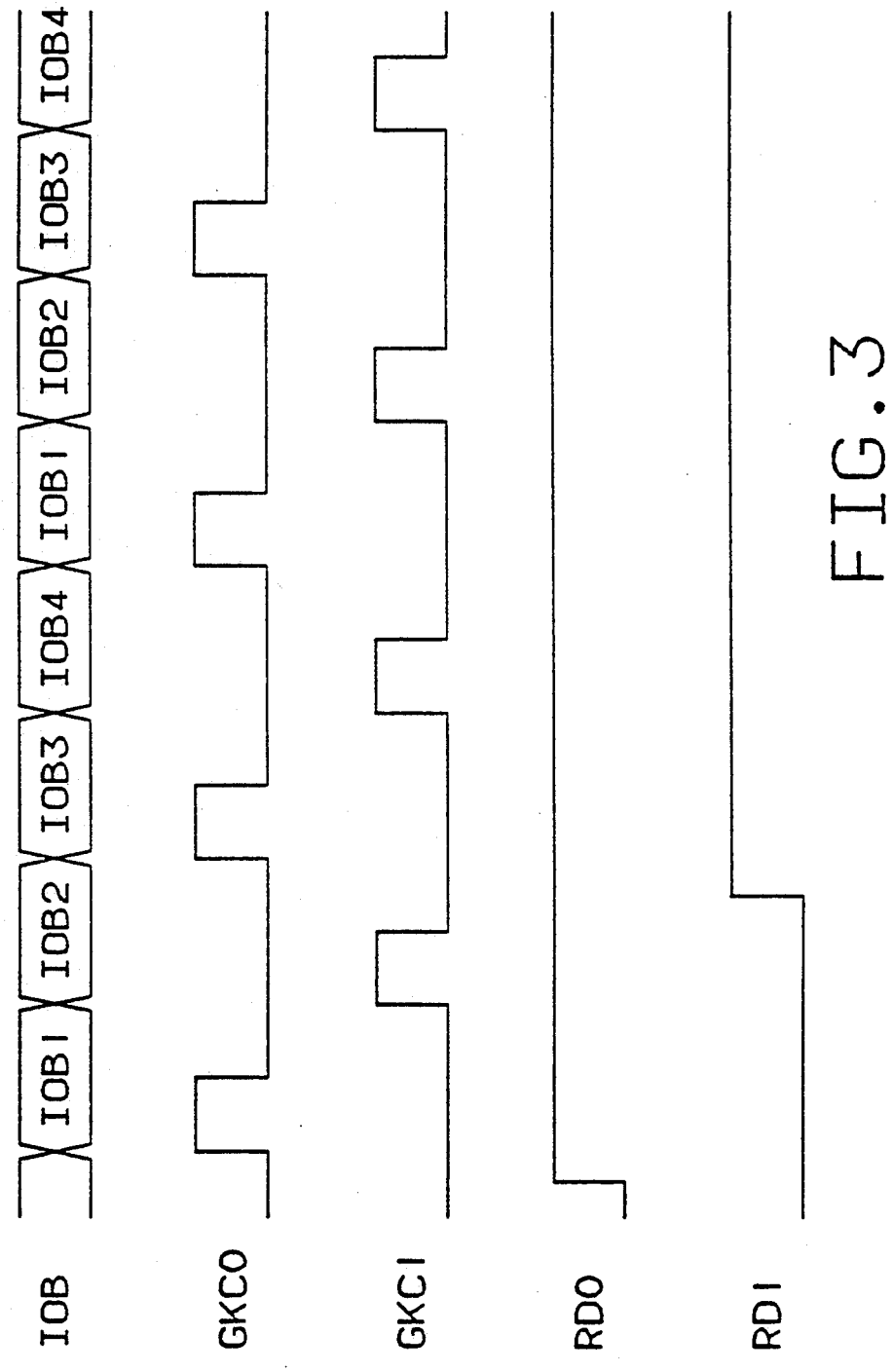
FIG. 3 shows different signals used on the like named links (10B, GKC0-1, RD0-1) of FIG. 1.

The data link 10B, of which the like named signal is shown in FIG. 3, is used to transfer frames of 16 bits of control data in each direction, i.e. from the DSP to the ESLIC's and vice versa, one bit being transferred per clock cycle. This control data is for instance constituted by off-hook or on-hook detection signals of a subscriber telephone set.

By operating the line interface circuits ESLIC1-4 at 256 kHz and by using the data link 10B at a data rate of 1.024 Mbit/s, this data link 10B may carry four multiplexed channels 10B1 to 10B4 (FIG. 3) which may then be assigned to respective ones of the four circuits ESLIC1/4 as well as to the four digital signal processors of the DSP chip. The assignment of the ESLIC1/4 is defined by the connections (FIG. 1) and by the relative timing between the above read/write signals RD0/1 and clock signals GKC0/1 (FIG. 3) as explained below.

The clock signal GKC1 (FIG. 3) is delayed or shifted by half a clock cycle with respect to the clock signal GKC0, whilst the read/write signal RD1 is delayed with respect to the other read/write signal RD0 by a full clock cycle of GKC0/1.

Each line interface circuit ESLIC1/4 includes a divider circuit (not shown) which divides by two the clock signal applied at its terminal GKC0/1. In other words, the four ESLIC1-4 operate at a clock frequency of 256 kHz instead of the 512 kHz supplied at their clock input GKC0/1. This means that only one out of the two clock cycles of GKC0/1 is handled or acknowledged by ESLIC1/4.

Furthermore, each line interface circuit ESLIC1/4 also includes a gating circuit (not shown) which enables transfer from/to the data link 10B when both the other signals RD0/1 and GKC0/1 (one out of the two) applied thereto are activated or high.

Summarizing, the read/write signals RD0-1 and the clock signals GKC0-1 are not only used separately for enabling the transfer of the control data 10B1-4 between the data link 10B and the line interface circuits ESLIC1-4, but are also used in combination for identifying and selecting the line interface circuit ESLIC1/4 associated to the control data 10B1/4 actually on the data link 10B. Because the data link 10B carries control data 10B1-4 which is subdivided into frames of 16 bits, the read/write signal RD0/1 remains active or high for 16 occurences of 10B1/4, i.e. for 32 clock cycles of GKC0/1.

For instance the control data in channel 10B1 is transferred between the line interface circuit ESLIC1 and the data link 10B when both the read/write signal RD0 and, e.g., the odd occurences of the clock signal GKC0 are high. Similarly, the control data in channel 10B2 is on the data link 10B when both RD0 and the odd occurences of GKC1 are high, the control data in channel 10B3 is on the data link 10B when both RD1 and the even occurences of GKC0 are high, and the control data in channel 10B4 is on the data link 10B when both RD1 and the even occurences of GKC1 are high.

The above signals 10B, GKC0/1 and RD0/1 are generated at respectively like named outputs of a circuit shown in FIG. 4. A master clock signal GKC of 4,096 kHz and control data 10B1-4 of the four digital signal processors of the DSP and intended to like named channels of the data link 10B are applied to inputs of this circuit. Moreover this circuit forms part of the DSP and includes a multiplexer MUX, a binary counter BC, an inverter 10, two AND gates A0 and A1, and three D-flip flops FF0, FF1 and FF2.

The master clock signal GKC is supplied to the multiplexer MUX as well as to the binary counter BC which subdivides the frequency of this signal GKC so as to provide, amongst others, signals of 1,024 kHz, 512 kHz and 8 kHz.

The four control data 10B1-4 are also applied to the multiplexer MUX at one output of which the 4-channels multiplexed data 10B is generated, MUX generates also a frame synchronization signal FR which is applied to the binary counter BC in order to synchronize the above signals 10B, GKC0-1 and RD0-1.

The outputs at 1,024 kHz and at 512 kHz of BC are connected to the two inputs of the AND gate AD directly and via the inverter 10 respectively. The output of A0 and the master clock GKC are connected to the clock and D inputs of the D-flip flop FF0 respectively. At the output of FF0 the 512 kHz clock signal GKC0 is generated.

The outputs at 1,024 kHz and at 512 kHz of BC are also directly connected to the two inputs of the AND gate A1 whose output is connected to the clock input of the D-flip flop FF1, the latter FF1 being also controlled by the master clock signal GKC applied to its D input. The 512 kHz clock signal GKC1 is available at the output of FF1.

The output at 8 kHz of BC constitutes the read/write signal RD0 and is also connected to the input of the D-flip flop FF2. The D input of the D-flip flop FF2 is controlled by the signal at the output of the AND gate A0 and provides at its output the 8 kHz read/write signal RD1.

The operation of this circuit is not explained in more detail here since all the constituent parts thereof are well known in the art.

While the principles of the invention have been described above in connection with specific apparatus, it is to be clearly understood that this description is made only by way of example and not as a limitation an the scope of the invention.

We claim:

1. Data transfer connection between a primary device and m × n secondary devices, wherein m and n are each integers greater than one, the connection comprising:
    a single data link comprising m × n multiplexed data channels assigned to respective ones of said m × n secondary devices,
    m clock links each connected to a distinct respective group of n secondary devices and carrying a different one of m clock signals, each of said m clock signals having a same clock frequency and being mutually shifted by $1m^{th}$ of a cycle of said same clock frequency, and
    n read/write links each connected to a distinct respective group of m secondary devices and carrying a different one of n read/write signals, each of said read/write signals being mutually shifted by one cycle of said same clock frequency,
wherein each of said secondary devices is connected to a different pair of
    one of said m clock links and
    one of said n read/write links.

2. Data transfer connection according to claim 1, wherein data is transferred between said primary device and one of said secondary devices when both the associated read/write signal and the associated clock signal are in a predetermined status.

3. Data transfer connection according to claim 1, wherein said same clock frequency is n times higher than an operational frequency at which said secondary devices operate.

4. Data transfer connection according to claim 3, wherein the transmission frequency at which said m × n multiplexed data channels are transmitted on said data link is m times higher than said clock frequency.

5. Data transfer connection according to claim 3, wherein
    data is transferred between said primary device and one of said secondary devices when both the associated read/write signal and the associated clock signal are in a predetermined status, and
    said data is only transferred at one out of n occurrences of said associated read/write signal and said clock signal both being in said predetermined status.

6. Date transfer connection according to claim 1, wherein said data is transferred between said primary device and each of said m×n secondary devices every n cycles of said same clock frequency.

7. Data transfer connection according to claim 1, wherein said primary device controls the transfer of said data.

8. Data transfer connection according to claim 1 wherein m is equal to n.

* * * * *